(12) United States Patent
Koenders

(10) Patent No.: US 8,309,642 B2
(45) Date of Patent: Nov. 13, 2012

(54) METHOD FOR DISSOLVING ARAMID POLYMER IN SULFURIC ACID USING A DOUBLE SHAFT KNEADER

(75) Inventor: Bernardus Maria Koenders, Westervoort (NL)

(73) Assignee: Teijin Aramid B.V., Arnhem (NL)

( * ) Notice: Subject to any disclaimer, the term of this patent is extended or adjusted under 35 U.S.C. 154(b) by 225 days.

(21) Appl. No.: 12/448,811

(22) PCT Filed: Jan. 30, 2008

(86) PCT No.: PCT/EP2008/000712
§ 371 (c)(1), (2), (4) Date: Jul. 8, 2009

(87) PCT Pub. No.: WO2008/095632
PCT Pub. Date: Aug. 14, 2008

(65) Prior Publication Data
US 2010/0063205 A1    Mar. 11, 2010

(30) Foreign Application Priority Data
Feb. 3, 2007  (EP) .................................. 07002381

(51) Int. Cl.
*C08G 69/26* (2006.01)
(52) U.S. Cl. .................. 524/422; 524/606; 528/331
(58) Field of Classification Search .............. 524/422
See application file for complete search history.

(56) References Cited

U.S. PATENT DOCUMENTS

| | | | |
|---|---|---|---|
| 5,599,623 A | 2/1997 | Selle | |
| 5,667,108 A * | 9/1997 | Braun et al. | 222/181.1 |
| 5,882,791 A * | 3/1999 | van der Werff et al. | 428/364 |
| 2005/0228095 A1* | 10/2005 | Onishi et al. | 524/425 |

FOREIGN PATENT DOCUMENTS

| | | |
|---|---|---|
| CN | 1048710 A | 1/1991 |
| WO | WO 96/34732 A1 | 11/1996 |
| WO | WO 00/77515 A2 | 12/2000 |
| WO | WO 03/085049 A1 | 10/2003 |
| WO | WO 2006/045517 * | 5/2006 |
| WO | WO 2006/045517 A1 | 5/2006 |

OTHER PUBLICATIONS

European Search Report issued in European Patent Application No. 07002381.7 on Jul. 16, 2007.

* cited by examiner

*Primary Examiner* — Doris Lee
(74) *Attorney, Agent, or Firm* — Oliff & Berridge, PLC

(57) ABSTRACT

A method for dissolving an aramid polymer in sulfuric acid using a double shaft kneader, comprising the steps: dosing the polymer and the solvent into the kneader, mixing the polymer and the solvent to dissolve the polymer in the solvent for obtaining a solution, degassing the solution to obtain a spin dope, and transporting the spin dope out of the kneader, wherein the polymer is an aramid polymer and the solvent is sulfuric acid, and whereby the aramid polymer is dosed into the kneader prior to dosing the sulfuric acid into the kneader.

6 Claims, 1 Drawing Sheet

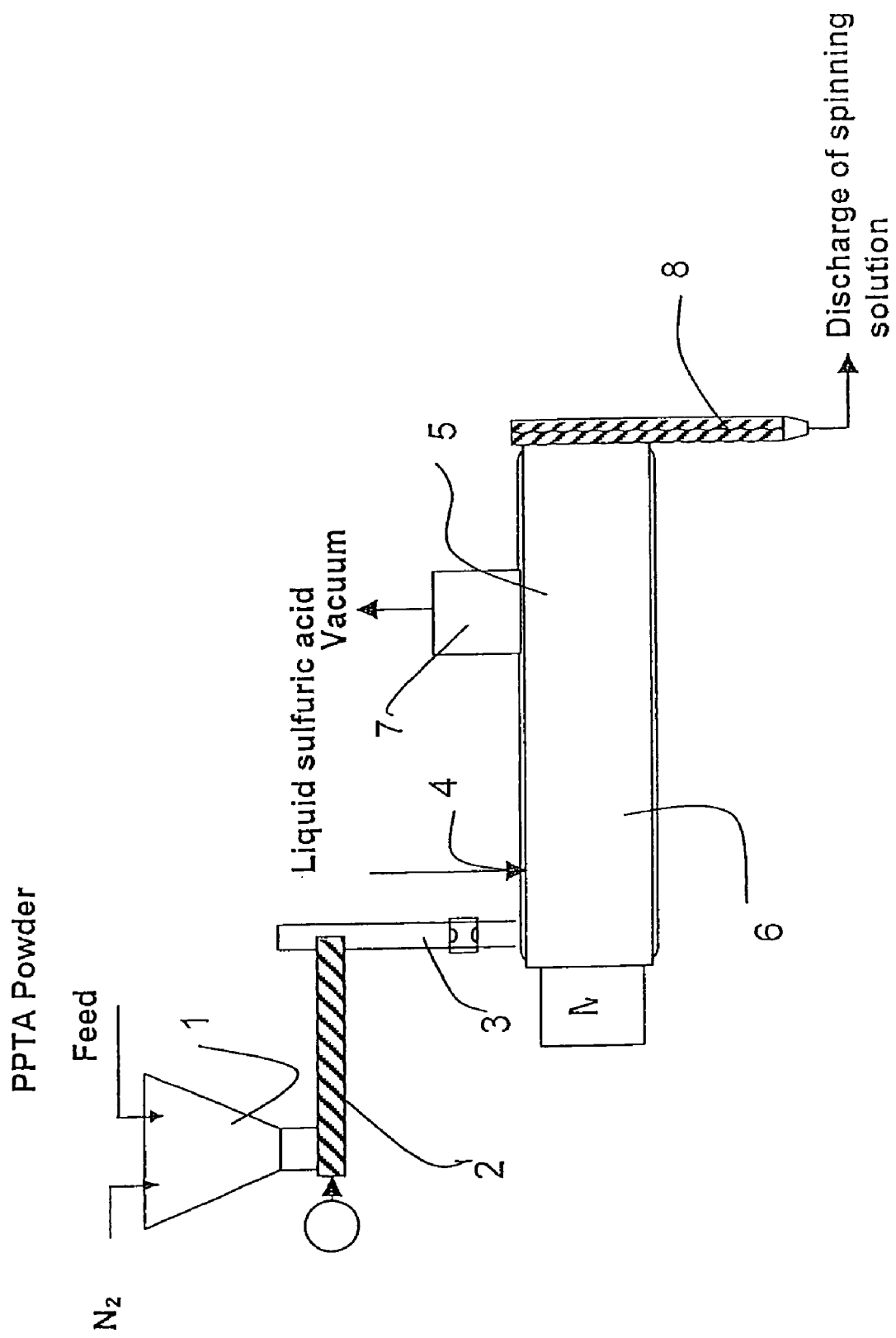

METHOD FOR DISSOLVING ARAMID POLYMER IN SULFURIC ACID USING A DOUBLE SHAFT KNEADER

The invention pertains to a method for dissolving aramid polymer, more particularly PTTA (poly(para-phenyleneterephthalamide)) in sulfuric acid using a double shaft kneader.

Methods for dissolving aramid polymer are known in the art. Common methods include dissolving aramid polymer in liquid sulfuric acid in a reactor or kneader and degassing the formed solution, such as disclosed in WO 00/77515. The process takes about 4 hours at a temperature of 85° C., which causes degradation of the aramid polymer.

Alternatively, according to U.S. Pat. No. 5,599,623 dissolving aramid polymer in sulfuric acid is performed at low temperature (below 25° C.), for instance using frozen sulfuric acid ice, followed by melting and degassing the produced solid solution. The process takes about 6 hours and has therefore a large residence time distribution. This process is limited to mixtures having a PTTA as the aramid polymer having a content between 17.5 and 19.8 wt %. Below 17.5 wt % PPTA a substantial amount of off-spec material is formed in sulfuric acid. Further, copolymers obtained from TDC (terephthaloyl dichloride) and PPD (para-phenylenediamine), and further monomers such as DAPBI (5-(6)-amino-2-(p-aminophenyl)benzimidazole), CI-TDC (2-chloroterephthaloyl dichloride), and CI-PPD (2-chloro-p-phenylenediamine), cannot be dissolved or can only be dissolved with large difficulties because the formed solid solutions become too sticky and/or are formed to big lumps that cannot easily be processed further. These known methods thus have inherent disadvantages.

An improvement was suggested in WO 2006/045517. According to that method PPTA or copolymer thereof is transported into a twin screw extruder, after which sulfuric acid is introduced and mixed to dissolve the PPTA in sulfuric acid. After film forming and degassing, the spinning dope containing PPTA leaves the twin screw extruder. This method has a few other disadvantages, such as occurrence of small variations in the dosing that are not extinguished and which are visible as variations in the PPTA concentration of the output. Twin screw extruders have a small working volume and therefore short residence time. For constant results a stringent control system is necessary. Furthermore, a twin screw extruder is an expensive apparatus, making this method commercially less attractive. Twin screw extruders are different apparatuses than twin screw kneaders. The space between the screw and the inner surface of the extruder is small. In a kneader it is not primarily intended to transport the material out of the kneader, but the shafts are constructed so that the material is thoroughly kneaded. Twin shaft kneaders have a big working volume and therefore a long residence time. This requires a different shaft type, which is relatively small and leaves sufficient space between the shaft and the inner surface of the kneader for kneading action. The shear level in a kneader is lower than in an extruder leading to a process with low energy dissipation compared to an extruder. Low energy dissipation also means low amounts of cooling energy needed to carry the dissolving process.

In CN 1048710 a method was disclosed relating to a polymerization process by mixing para-phenyl diamine and para-phenyl diformylchloride in a dual-shaft mixer to obtain poly (para-phenyl diformyl para-phenyl diamine). The product thereafter is degassed in an air-exhausting dual-arbor extruder. The dual-shaft mixer and the dual-arbor extruder are thus used to obtain a polymeric resin from a polymerization reaction, and are not used for dissolving the polymer in a solvent to obtain a spin dope.

WO 96/34732 discloses the use of a single shaft kneader. In such single shaft kneader a polymeric material is melted and degassed. The polymeric material must however, first be dissolved before it can enter the single shaft kneader, whereby the solvent (sulfuric acid) is added to a separate dissolving unit prior to the addition of the polymer. Such single shaft kneaders are unsuitable for dissolving aramid polymer, which is the subject of the present invention.

The invention has to its objective to provide a method which does not have the above disadvantages. To this end a new method has been developed. The invention therefore relates to a method for dissolving an aramid polymer in sulfuric acid using a double shaft kneader, comprising the steps:

a) dosing the polymer and the solvent into the kneader;
b) mixing the polymer and the solvent to dissolve the polymer in the solvent for obtaining a solution;
c) degassing the solution to obtain a spin dope;
d) transporting the spin dope out of the kneader;
wherein the polymer is an aramid polymer and the solvent is sulfuric acid and whereby the aramid polymer is dosed into the kneader prior to dosing the sulfuric acid into the kneader.

Dosing of the solid polymer into the kneader is preferably performed with a rotary valve, which has the additional advantage that the kneader can work under vacuum that is used to degas the formed spinning dope.

The double shaft kneader as used in this invention is suitable to dissolve any aramid polymer (including copolymers) in sulfuric acid. Most suitable are polymers and copolymers made of TDC (terephthaloyl dichloride) and PPD (para-phenylenediamine), but copolymers made of monomers further comprising monomers such as DAPBI (5-(6)-amino-2-(p-aminophenyl)-benzimidazole), CI-TDC (2-chloroterephthaloyl dichloride), NDC (naphthyloyl dichloride), and CI-PPD (2-chloro-p-phenylenediamine), can equally well be used. All these and other polymers and copolymers are well known in the art.

The invention is illustrated in FIG. 1.

FIG. 1 is a schematic view of a double shaft kneader.

According to an embodiment of the invention the aramid polymer, such as PPTA as indicated in the FIGURE, is dosed into the first part 1 of the kneader and transported to transport means 2. The polymer is then introduced in kneader though rotary valve 3. Sulfuric acid is injected into the kneader through inlet 4, which is positioned after valve 3. This order of introducing polymer and sulfuric acid into the kneader prevents the risk of clogging and blockage of the inlet for PPTA (or generally aramid polymer) due to forming big lumps as the result of PPTA and sulfuric acid mixing. By first introducing PPTA and then sulfuric acid into the kneader, the mixing and the dissolution processes will occur simultaneously. The advantage of the double shaft kneader over the prior art is to give sufficient plug-flow with enough residence time to extinguish feed fluctuations, to supply intensive mixing, and to clean simultaneously the barrel. The double shaft kneader (also called twin shaft kneader) comprises two co-rotating shafts, which combine a cleaning and a kneading action. It is also possible to use two co-rotating shafts one of which having a high rotation speed for cleaning action, and the other having a low rotation speed for the kneading action. The heat dissipation during mixing and the energy emerging from dissolving the polymer are sufficient to carry out the total process almost adiabatically. After dissolution of the aramid polymer in sulfuric acid the solution can be degassed using under-pressure in part 5 of the kneader 6 by using a vacuum pomp 7 or other means to obtain vacuum. Because the aramid polymer is dosed by rotary valve 3 the dissolved polymer can be degassed under low pressure (e.g. at 40 mbar absolute) in the double shaft kneader. The degassed solution can be used as a spin-dope, and is transported at a certain predetermined pressure from kneader 6 by output means 8, which is depicted in the FIGURE as a discharge screw.

The dissolution method of the invention preferably takes place in less than 180 min. More often the method is performed for 45 to 120 min, and usually for 45 to 60 min.

The method allows dissolution of aramid polymer in any concentration because there is no solid solution stage which may cause a substantial amount of off-spec material when using low concentrations or when using copolymers.

The method also allows using nanoparticles, such as nanotubes, in the solution. To obtain such spin dopes the aramid polymer is mixed with nanoparticles and thereafter with sulfuric acid, or alternatively the sulfuric acid solution of the aramid polymer is mixed with nanoparticles.

Further, the double shaft kneader equipment for the dissolution process is cheaper than twin screw extruders, or other equipment as required for other known routes. Also the energy consumption is lower than of the prior art methods.

The invention is further illustrated by the following non-limitative examples.

General

The dosing of aramid polymer was done at the beginning of the first part of the double shaft kneader (FIG. 1: 4). A rotary valve was used because the double shaft kneader was working at a pressure of 40 mbar for degassing the solution.

The dosing of the aramid polymer was carried out by a Loss in Weight system (gravimetric). Because the dissolution equipment has a buffer capacity which is equal to the dissolution time (60 minutes), there was no need for a dosing system having high accuracy.

The dosing of sulfuric acid took place at the end of the first part of the double shaft kneader (FIG. 1: 5). Sulfuric acid was introduced into the kneader through a pressure valve allowing introduction into the double shaft kneader working at a pressure of 40 mbar. The dosing of liquid sulfuric acid was carried out with a gear pump or 3-headed plunger pump. The flow of sulfuric acid was measured with a Coriolis tube with backwards controlling of the frequency of the pump to allow correct dosing of the sulfuric acid. Because of the buffer capacity, there was no need for a dosing system having high accuracy.

Dissolving PPTA in Sulfuric Acid

The dissolving of PPTA in sulfuric acid took place in a double shaft kneader made of material which is resistant against wear and tear of the process.

EXAMPLE 1 x wt % PPTA having $\eta_{rel}$ 5.01 were dosed into the double shaft kneader, and 100-x wt % sulfuric acid were injected into the double shaft kneader. The sulfuric acid had a purity of 99.8%. The speed of the kneaders was about 32 and 25.6 rpm. Vacuum for degassing was set to 40 mbar (absolute pressure). The output pressure extruder was 4 bar. The dissolving capacity was 30 Kg/h. The temperature of the dissolving process was 85° C. The following spin dopes having different concentrations and $\eta_{rel}$ were prepared.

| PPTA (xwt %) | $\eta_{rel}$ |
|---|---|
| 17.7 | 4.59 |
| 19.5 | 4.75 |
| 18.7 | 4.88 |
| 19.0 | 4.78 |

Due to the very limited degradation there is only a small decrease of the relative viscosity.

EXAMPLE 2

19.5 wt % of a copolymer prepared from PPD and a TDC/NDC mixture containing 5 mole % NDC (naphthyloyl dichloride) having $\theta_{rel}$=5.84 were dosed into the double shaft kneader. 81.5 wt % sulfuric acid were injected into the double shaft kneader at a capacity of 28.2 Kg/h. The kneader speed was about 52/42 rpm, and the vacuum for degassing was 40-100 mbar (absolute pressure). The output pressure extruder was 4 bar. The spin dope had $\eta_{rel}$ 4.06-4.33.

The invention claimed is:

1. A method for dissolving a polymer in a solvent using a double shaft kneader, comprising the steps:
   a) dosing the polymer and the solvent into the kneader;
   b) mixing the polymer and the solvent to dissolve the polymer in the solvent for obtaining a solution;
   c) degassing the solution to obtain a spin dope;
   d) transporting the spin dope out of the kneader by separate output means, wherein the polymer is an aramid polymer and the solvent is sulfuric acid, and whereby the aramid polymer is dosed into the kneader prior to dosing the sulfuric acid into the kneader.

2. The method according to claim 1 wherein the aramid polymer is dosed into the kneader using a rotary valve.

3. The method according to claim 1 wherein the aramid polymer is obtained from a mixture of monomers at least comprising TDC and PPD.

4. The method according to claim 1 wherein the aramid polymer is PPTA.

5. The method according to claim 1 wherein the residence time of the aramid polymer in the double shaft kneader is less than 180 min.

6. The method according to claim 1 wherein the aramid polymer is mixed with nanoparticles and thereafter with sulfuric acid, or wherein the sulfuric acid solution of the aramid polymer is mixed with nanoparticles.

* * * * *

UNITED STATES PATENT AND TRADEMARK OFFICE
CERTIFICATE OF CORRECTION

| | |
|---|---|
| PATENT NO. | : 8,309,642 B2 |
| APPLICATION NO. | : 12/448811 |
| DATED | : November 13, 2012 |
| INVENTOR(S) | : Bernardus Maria Koenders |

Page 1 of 1

It is certified that error appears in the above-identified patent and that said Letters Patent is hereby corrected as shown below:

Column 4, line 23, "$0_{rel}$" should be -- $\eta_{rel}$ --

Signed and Sealed this
First Day of January, 2013

David J. Kappos
*Director of the United States Patent and Trademark Office*